(12) United States Patent
Levine (10) Patent No.: US 6,502,035 B2
(45) Date of Patent: Dec. 31, 2002

(54) AUTOMOTIVE SAFETY ENHANSING SYSTEM

(76) Inventor: Alfred B. Levine, 9005 Seven Locks Rd., Bethesda, MD (US) 20817

( * ) Notice: Subject to any disclaimer, the term of this patent is extended or adjusted under 35 U.S.C. 154(b) by 0 days.

(21) Appl. No.: 09/854,567

(22) Filed: May 15, 2001

(65) Prior Publication Data

US 2002/0019703 A1 Feb. 14, 2002

Related U.S. Application Data

(60) Provisional application No. 60/222,592, filed on Aug. 2, 2000, and provisional application No. 60/245,587, filed on Nov. 6, 2000.

(51) Int. Cl.[7] .................................................. B60Q 1/08
(52) U.S. Cl. ....................... 701/301; 701/117; 340/465; 340/467
(58) Field of Search ............................... 340/425.5, 463, 340/464, 465, 466, 467, 468, 901; 701/301, 117, 118

(56) References Cited

U.S. PATENT DOCUMENTS 5,570,087 A * 10/1996 Lamelson ............... 340/870.05
6,163,277 A * 12/2000 Gahlot ......................... 340/905

* cited by examiner

Primary Examiner—William A. Cuchlinski, Jr.
Assistant Examiner—Arthur D. Donnelly (57) ABSTRACT

A safety system for automotive vehicles to automatically detect and monitor various movements of a driven vehicle and automatically communicate such movements to others and to the police. Among others, the system detects violations of the traffic laws, including speeding, running stop signs, aggressive driving, tail gating and others. It also detects turns, lane changes, U turns, accelerations, decelerations, proximity to other vehicles, slow driving, weaving from lane to lane and and others. Where a pattern of vehicle movements demonstrates aggressive driving of the vehicle a warning is given to other vehicles. The detected movements may be recorded and/or transmitted by wireless to the Police to enforce penalties against traffic violations. Warnings and other communications may be provided inside of the monitored vehicle to remind the driver and discourage fixture improper conduct and to assist impaired drivers that may lose concentration or hand-eye coordination in control of the vehicle. The exterior communication to others may include flashing lights, horn soundings, sirens and other. The interior communication to the monitored vehicle's driver may be by a visual display, audible announcement, or other.

18 Claims, 3 Drawing Sheets

AUTOMOTIVE SAFETY ENHANSING SYSTEM

This application claims the benefit of Provisional applications No. 60/222,592, filed Aug. 2, 2000; and No. 60/245.587 filed Nov. 6, 2000.

STATEMENT OF INVENTION

This invention generally relates to promoting greater safety in the operation of automotive vehicles, and more particularly to systems for warning drivers and others of both the safe and unsafe movements of other vehicles to avoid dangers to themselves and to others.

BACKGROUND

There are presently about 220 million automobiles in the United States, almost one vehicle for every man, woman, and child, regardless of age. Many metropolitan areas are congested with excessive auto volume resulting in long delays during travel and often requiring frequent detours away from a desired destination. Even normally careful drivers proceed unsafely at times to shorten travel times, whereas aggressive drivers frequently proceed recklessly in disregard for the safety of themselves and others. Still other drivers are fully or partially impaired as a result of aging, use of alcohol, or for other reason, operating their vehicles with deminished hand-eye coordination constituting a hazard to others.

SUMMARY OF INVENTION

According to the the present invention there is provided a system for continually monitoring various movements of a vehicle to alert others of such movements that may otherwise be unexpected and unsignaled by the drivers. Such warnings may include reckless driving, overly aggressive driving, erratic driving, unexpected vehicle movements, and others, thereby enabling other drivers to be warned and to avoid such improperly driven vehicles. Certain of the monitored movements may in themselves be unlawful, such as speeding beyond the speed limit, or not stopping at stop unlawful, such as speeding beyond the speed limit, or not stopping at stop signs. Other monitored movements may not be unlawful, in themselves, but collectively demonstrate an unlawful pattern of reckless driving. Further according to the invention, such monitored vehicle movements are communicated to the police, with a record being made for later prosecution of unlawful conduct in the operation of the vehicle.

DETAILED DESCRIPTION OF PREFERRED EMBODIMENTS

Figure 1:
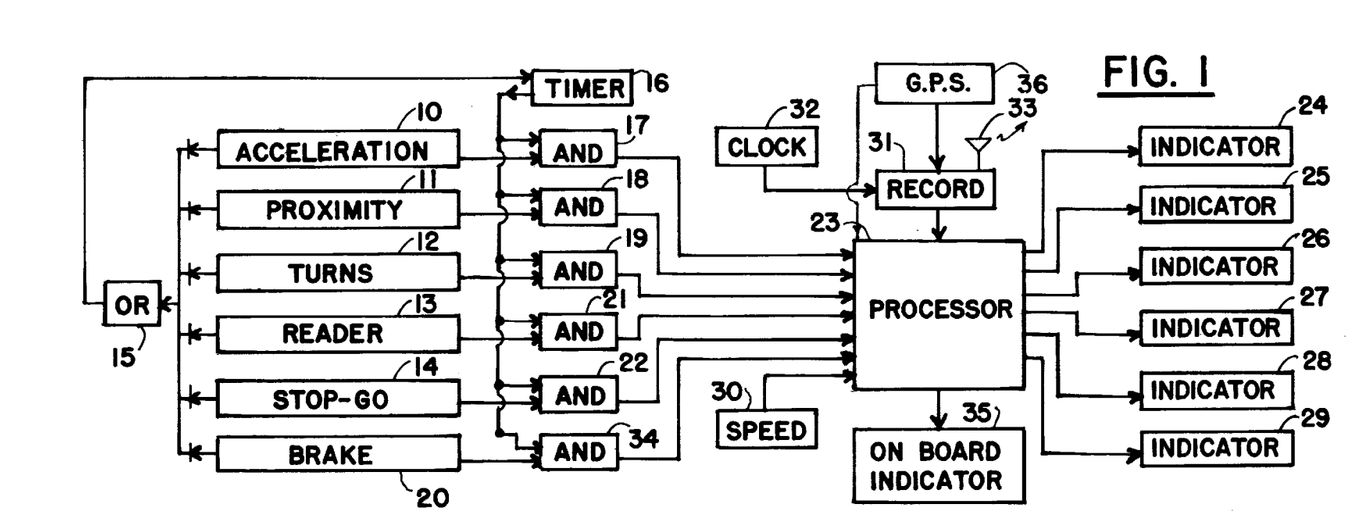
FIG. 1 is a block diagram illustrating one preferred system for monitoring and warning of reckless driving and other movements.

Referring to the drawings there is shown in FIG. 1, an on-board system for automotive vehicles to detect various vehicle movements and determine whether the vehicle is being driven in a reckless, unsafe manner, endangering both the vehicle driver as well as other vehicles and drivers in the vicinity of the unsafely driven vehicle. Upon determining reckless driving to exist, the system then automatically signals this event to other drivers, and to the police, to warn such others of the dangers and to enable the police to apprehend the unsafe driver.

Referring to FIG. 1, the on-board system includes a a plurality of sensors 10 to 14, each of which detects a different type of movement or condition of the vehicle. The accelerometers 10 detect forward and sideward accelerations of the vehicle. Thus when the vehicle turns to the right or left; or changes lanes on a highway, the centrifugal forces are detected and corresponding signals are generated. The proximity detectors 11 determine whenever a vehicle approaches too closely to another vehicle or object, either in front of or at the side of that vehicle. The external detector or reader 13 reads road signs posting speed limits, stop signs, stop lights, and others, to generate signals when the regulations of such signs are not followed by the vehicle. The stop-go detector 14 detects the slow down, stopping and renewed forward motion of the vehicle.

Upon detecting any of the above movements or conditions, a signal is generated by that sensor to energize the OR circuit 15 to, in turn, trigger the operation of a timer 16. The timer 16 operates for a selected short time interval after energization and then shuts off. It may be preset from 3 to 5 minutes, more or less. During its operating time interval, the timer energizes all the AND circuits 17 TO 19, and 21, 22 that are each coupled to a different one of the sensors 10 to 14, to enable signals from such sensors to pass through its associated AND circuit to the processor-counter 23, as shown, Thus upon the system detecting any one of the sensed movements or conditions, the timer 16 is activated to enable signals from the various sensors to pass through to the processor-counter 23.

The function of the processor-counter 23 is to accumulate and analyze the various sensor signals received during the timed interval and determine whether the vehicle is being operated recklessly and unsafely. This is performed by summing the number of sensor signals received during the short timed interval, and where a preset number of such signals has been received, to then energize appropriate ones of the indicators 24 to 29, inclusive, to signal a reckless driving condition to other drivers and the police. Although the individual movements detected by the various sensors may, in themselves, not be unsafe or indicative of reckless driving, a combination of such signals being generated within a short time interval defines a pattern of unsafe driving of the vehicle.

Reckless Driving

It has been observed that reckless and unsafe drivers engage in a continuing pattern of behavior in disregard of their own safety as well as the safety of others. Such drivers almost constantly accelerate to approach other vehicles at high speeds and then drive too closely, or "tail gate", such other vehicles. Such drivers also jump from lane to lane on highways to pass by other cars at high speeds, and often cut in front of other vehicles too closely when changing lanes. They accelerate and decelerate with complete disregard of other vehicles, and often do not signal turns and lane changes. They also momentarily stop and start; frequently exceeds posted speed limits, and frequently fail to stop at stop signs and stop lights. All of such movements are detected by the sensors 10 to 14 in FIG. 1, and when the number of such movements is excessive within a short time interval, it clearly indicates the reckless driving of the vehicle.

Thus the on board sensors detect the various movements of the vehicle including the number of accelerations forwardly and backwardly, the number of turns and lane changes, the number of its close approaches to other vehicle and objects, whether it has exceeded the speed limits, and or run through stop signs or lights, and has accumulated a number of such events within fixed time limits. Although each of such movements may not, in themselves, be indicative of unsafe or reckless driving, a pattern of such events occurring within a short time interval clearly demonstrates the contrary. Where at least four or more of such events have occurred within a short time of a few moments, a pattern of unsafe driving has become evident.

Where a condition of reckless, unsafe driving has been established, the processor-counter circuit 23 energizes various ones of the vehicle indicators 24 to 29 to warn other drivers of the unsafe operation of that vehicle. The indicators 24 to 29 may include the external signal lights that are presently found on automobiles, as well as additional lights and/or other indicators. Presently, automobiles are provided with rear end lights, eg tail lights, that are operated in unison in a flashing mode to indicate emergencies. The same lights may be used to indicated reckless driving by operating them alternately in a flashing mode rather than in unison. Such alternate flashing of the lights serve to warn other drivers, as well as to alert the police of the violations.

Returning to FIG. 1, after each timed interval has expired, the timer 16 resets the processor-counter 23 and deenergizes the AND circuits 17 to 19 and 21, 22, all in preperation to respond to any subsequent unsafe driving of the vehicle. The vehicle indicators 24 to 29 may continue to be energized for a period afterward to insure that other drivers are made aware of the previously detected reckless operation of the vehicle. In the event that the driving of the vehicle continues to be conducted in a reckless manner, a subsequently generated signal from any of the sensors 10 to 14 initiates a new operation of the timed system, as described above, to again determine if reckless driving has continued or persisted. Thus the system is periodically operated and reset to continually monitor the driving of the vehicle and indicate whether it is being driven in a reckless and unsafe manner.

In addition to operating the external indicators of the vehicle, the processor-counter 23 may also energize indicators within the vehicle for signaling the driver and occupants of the vehicle, thereby to alert the operator that the unsafe operation is being indicated to others, and to the police. This may discourage such reckless conduct in the future. The reckless driving of the vehicle may also be wirelessly transmitted to the police and recorded by a recorder-transmitter unit 31, 33 that is energized by the processor-counter 23, as shown in FIG. 1. The detected episode of reckless driving that is recorded at 31 may also receive a recording of the time and location where such episode occurred. The time of this event may be entered by an internal clock 32, and the location is recorded in response to a received G.P.S. signal 36. Such wirelessly transmitted episode of reckless driving may also contain the license number of the automobile that may be stored in memory (not shown) and transmitted along with the time, date, and location.

Briefly recapitulating the above, the on-board system senses many of the movements and accelerations of the vehicle within fixed time intervals of a few moments or more. These movements and accelerations are accumulated to determine whether a pattern of such events has occurred indicative of reckless, unsafe driving of the vehicle. If so, external and internal indicators are automatically operated by the processor 23 to warn other drivers, notify the police, and also warn the operator of the vehicle. Additionally, the detected reckless driving may be reported to the police by wireless transmissions, identifying the time, location, and the license number of the vehicle. Each such determination of reckless driving is conducted during a fixed time interval, and the system is then automatically reset to continually monitor the movements of the vehicle after each such determination.

Lane Changes and Turns

Figure 2:
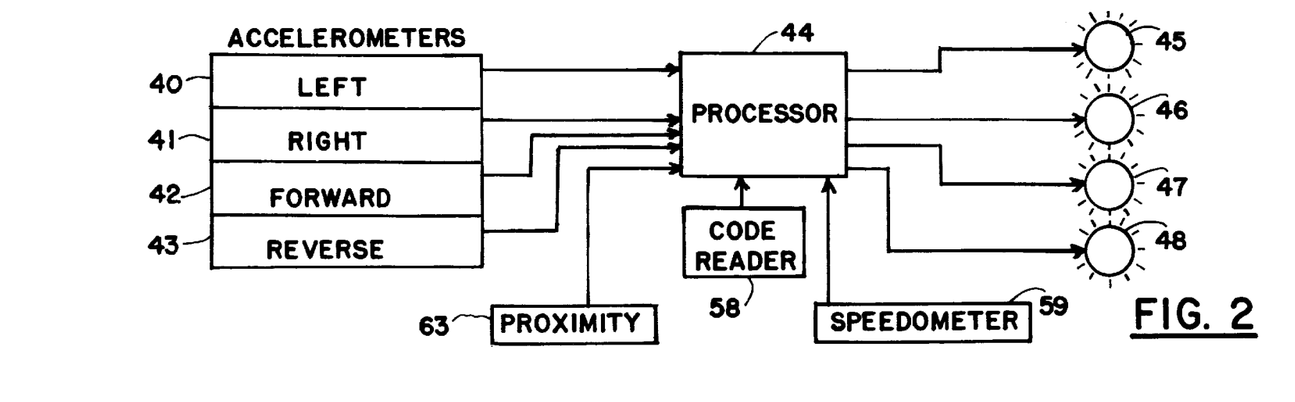
FIG. 2 is a block diagram showing further details of a portion of the system of FIG. 1.
Figure 3:
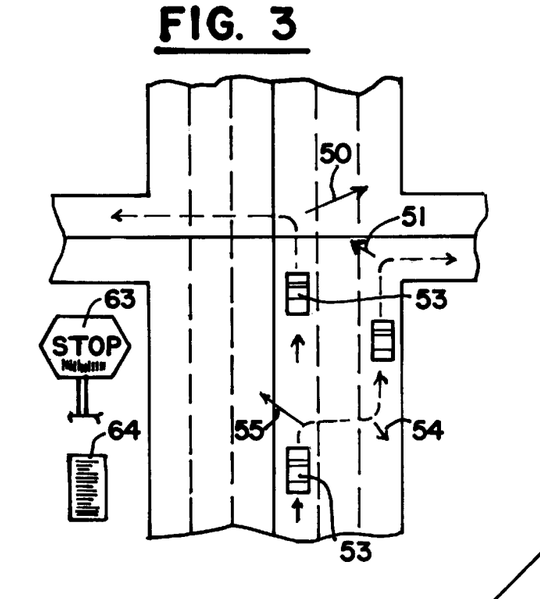
FIG. 3 is a plan view, from above, of a roadway, and showing various monitored movements of vehicles.

Many drivers fail to signal others when turning to the right or left, or when changing lanes. This often leads to collisions particularly in heavy traffic when many vehicles are proceeding closely together. According to the present invention the system detects the beginning of each such turns or lane changes and automatically operates the vehical indicators to signal other drivers of such movements. FIGS. 2 and 3 illustrate one preferred system for performing these functions. As shown in FIG. 2 one or more onboard accelerometers 40,41,42, and 43 are provided to detect the beginnings of each such movement in any direction (to the left, right, forward, or backward, respectively), and each such sensed movement results in a corresponding signal directed to a processor 44 to, in turn, selectively energize appropriate ones of vehicle indicators 45, 46, 47, and 48, to indicate such movement. As illustrated in FIG. 3 when a vehicle 53 begins a turn to the left, a centrifugal force 50 is generated outwardly, and this force is detected by accelerometer 40 (FIG. 2) to direct its signal to processor 44. Similarly, when a vehicle 53 turns right an outward centrifugal force 51 is generated and detected by accelerometer 41 to direct its signal to processor 44. The processor 44 responds to the left turn signal to automatically energize the left rear turn light indicator 48 on the vehicle 53 to warn other drivers of this turn. Similarly the right rear turn light indicator 45 on the vehicle 53 is automatically energized when a right turn is being made by the vehicle 53. Returning to FIG. 3, where a lane change is being made to the right, a first centrifugal force is generated by the right hand responsive accelerometer 41, as shown by the vector 55, as the vehicle 53 begins its turn to the right, and later a second centrifugal force 54 is generated by the left hand accelerometer 40 as the vehicle then turns to the left into the new lane. Thus during a lane changing manoever two different accelerometers are activated to signal the processor 44, with the time between the two signals related to the number of lanes being traversed during the lane changing movements. Accordingly, during lane changes both the vehicle left hand turn indicator 48 and the right hand indicator 45 are successively energized to signal the direction of the lane change and when it is commenced and completed. The signal processor 44 is provided with a conventional timing circuit (not shown) to terminate energization of the vehicle signal lights a short time after each energization, after the turning movements have been completed.

Briefly recapitulating these functions, as the vehicle changes its heading to either the right or left, a centrifugal force is generated by an accelerometer oriented in that direction, resulting in the vehicles turn light indicator for that direction being automatically energized to signal other drivers. Where the vehicle executes a lane change,or turns around, the various accelerometers respond to each directional movement to sequentially energize both the left and right indicators corresponding to the changes in direction or heading of the vehicle during that manoever. The time periods between the sequential energization of the different indicators correspond to the time for the vehicle to complete that manoever, thereby notifying other vehicles of the different movements of the vehicle in an automatic manner as those movements take place.

Forward and Reverse Accelleration

Forward acceleration of the vehicle is detected by accelerometer 42, and deceleration of the vehicle is detected by accelerometer 43, and signals generated by these accelerometers are directed to the processor 44 to, in turn, energize appropriate ones of the vehicle indicators to signal other drivers of such movements. According to the invention, deceleration of the vehicle can be signaled by flashing the conventional backup light indicators on the vehicle, whereas forward acceleration can be signaled to other drivers by using an additional light indicator on the vehicle that is dedicated to signaling that movement. As discussed above, signaling other drivers of the acceleration of decceleration of a vehicle, assists other drivers in avoiding a vehicle that is being driven recklessly, aggressively, erratically, or otherwise in a manner that is dangerous to others.

Speeding and Ignoring Stop Signs

Figure 4:
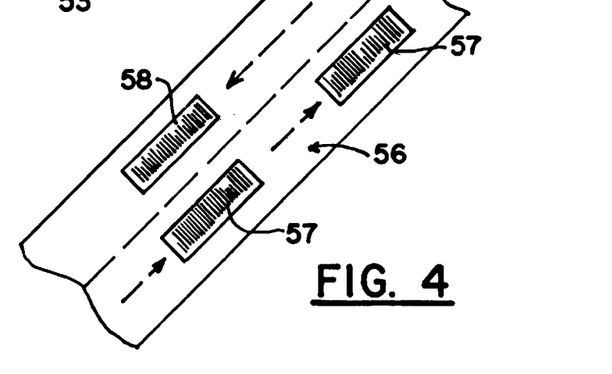
FIG. 4 is a plan view of a roadway, from above, and showing bar coded signs in the roadway for detection by passing vehicles.

As illustrated in FIG. 4, and discussed in earlier filed applications of the present inventor, the roadways 56 may be provided with coded signs 57, or other markings, identifying the various traffic regulations and traffic information that is applicable to that section of the roadway where such signs are located. Among others, such signs 57 may provide the posted speed limits for that roadway section, as well as stop signs at intersecting roads, and other traffic regulations and messages. Vehicles provided with code readers (58—FIG. 2 or 65—FIG. 7) read such coded signs 57 as the vehicles pass over the roadway, to detect the posted speed limits, and other road messages, and signals from the code reader 58 are directed to the processor 44 and displayed on a vehicle screen 35 internal of the vehicle and within the view of the driver, thereby to inform the vehicle driver of such regulations and messages. The actual vehicle speed, obtained from the conventional vehicle speedometer 59, is also directed to the processor 44. In the event that the current vehicle speed exceeds the posted speed limit for that section of the roadway, the processor 44 energizes appropriate ones of the vehicle external indicators 45–48, respectively to warn other drivers that the vehicle is speeding beyond the posted speed limit. The driver's internal display screen 35 is also energized to alert the driver of such violation, and the internal display 35 may also show, in miles per hour, the excess in speed over the posted limit. In a similar manner, when the vehicle passes by a coded sign 57 in or near the roadway that requires the vehicle to stop at the next intersection, and the vehicle fails to stop, this information is read by the code reader 58, to automatically signal and warn other drivers of this violation, as well as reminding the driver of such violation by a display on the internal display screen 100.

As discussed above, in the embodiment of FIG. 1, the above traffic violations may also be recorded at 31 for the police, and also wirelessly transmitted by tranmitter 33 to be received by the police.

Proximity Detection and Signaling

Figure 5:
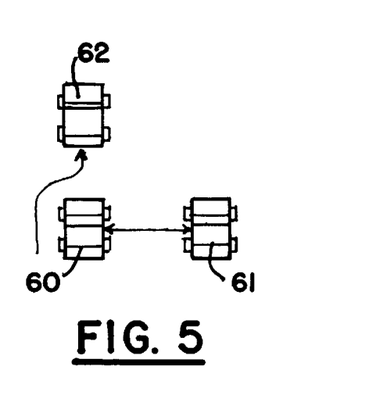
FIG. 5 is a schematic illustration showing improper movements of vehicles.

As shown in FIG. 5, reckless and aggressive drivers often approach too closely to other vehicles, engaging in "tail gating," "cutting off", and other such dangerous practices. For example, as shown, the vehicle 62 is proceeding too closely to vehicle 60 when passing in front of vehicle 60, thereby engaging in the dangerous practice of "cutting off" vehicle 60. Another vehicle 61 may also be traveling too closely alongside vehicle 60 whereby only a small movement to the left could result in a collision with vehicle 60. These and other close approaches, often at high speeds, are improper and should be avoided for reasons of safety. According to the invention, vehicles are provided with proximity detectors for detecting the close presence of other vehicles or objects that may present a hazard, and such proximity detectors automatically energize indicators on the vehicle to warn the driver of such hazards as well as warning other nearby drivers of vehicles. Proximity detectors 63 (FIG. 2), or 11 (FIG. 1) are known and available on the open market, using reflected sound waves (eg SONAR), or radio waves (eg RADAR), to detect other close objects. Such detectors may be provided on vehicles to detect the close presence of other objects either to the side, front, or rear of the vehicle, and to generate a warning signal in response to such close by detection. This signal is directed to the processor 44 (FIG. 2) to, in turn, energize one or more of the external indicators 45 to 48, respectively, and internal indicators within the vehicle to warn the vehicle driver. Accordingly, not only are the vehicles 60, 61, and 62 (FIG. 5) warned of the dangers, but any other nearby drivers are also warned to avoid chain collisions and other mishaps.

Waveforms

Figure 6:
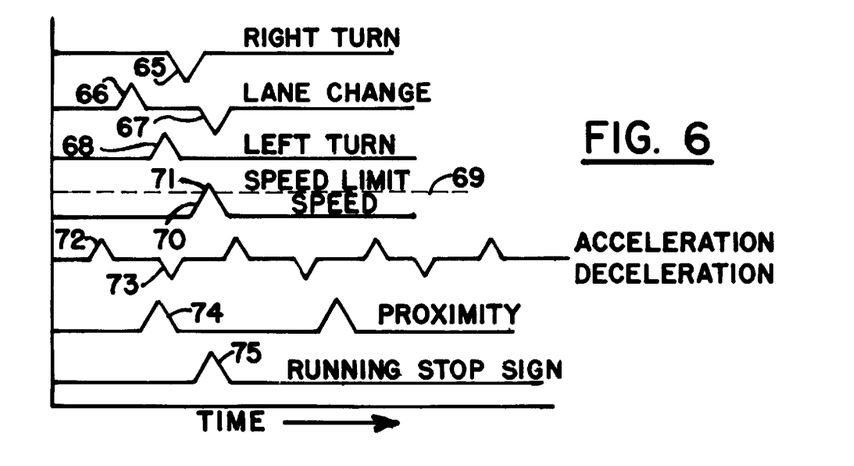
FIG. 6 is a waveform chart illustrating the waveforms of various signals generated by the onboard sensors of a vehicle.

FIG. 6 illustrates the waveforms of the various signals being generated by the detectors discussed above, and directed to the processor 44 (FIG. 2) or processor 23 (FIG. 1). As shown each of these signals is differentiated and pulsed to provide one or more triggering pulses of reduced ambiguity. A right turn of the vehicle results in a spiked or trigger pulse 65, as shown. A lane change to the left results in a pulse 66 followed by a pulse 67 from a different accelerometer detector as the lane change is completed. Similarly, a left turn results in trigger pulse 68; acceleration and deceleration result in pulses 72; proximity detection in pulse 74 (identified by the front, sides, or rear of the vehicle); and speeding in pulse 71. Where a coded stop sign 57 is passed without stopping, a pulse 75 is generated. In a similar manner other traffic violations can be determined by reading the coded road signs and detecting whether or not the vehicle responds to the detected traffic law or regulation. If the vehicle does not properly respond, a trigger pulse is automatically generated to operate the appropriate ones of the vehicle indicators signaling the occurance of a traffic violation. All of these pulses are directed to the processors, as described above, to operate the vehicle indicators thereby to warn other drivers and the police, and to remind the driver of the violating vehicle. As also discussed above, the detection of these various movements initiate the operation of the reckless driver detection system of FIG. 1 to accumulate the number of such pulses being generated within short timed intervals, thereby to determine whether a pattern of reckless driving has occurred. Where such reckless driving has been found to occur the aggressive driving indicators on the vehicle are operated to warn other drivers, and the police are notified as discussed above.

Road Markings and Signs

Figure 7:
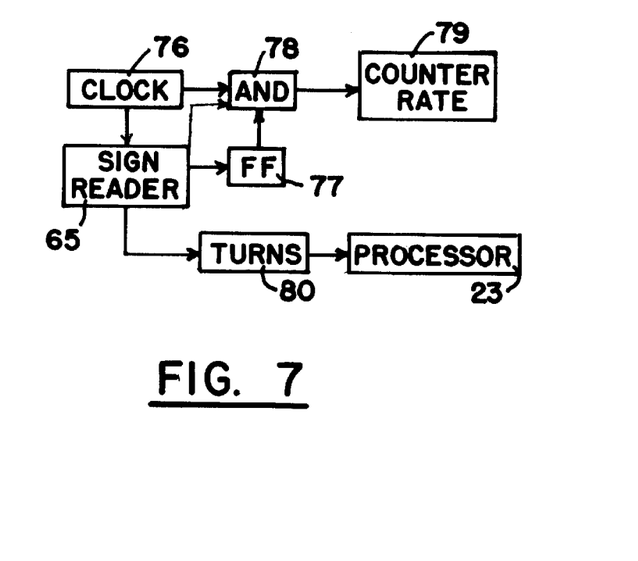
FIG. 7 is a block diagram of a modified portion of the system.
Figure 8:
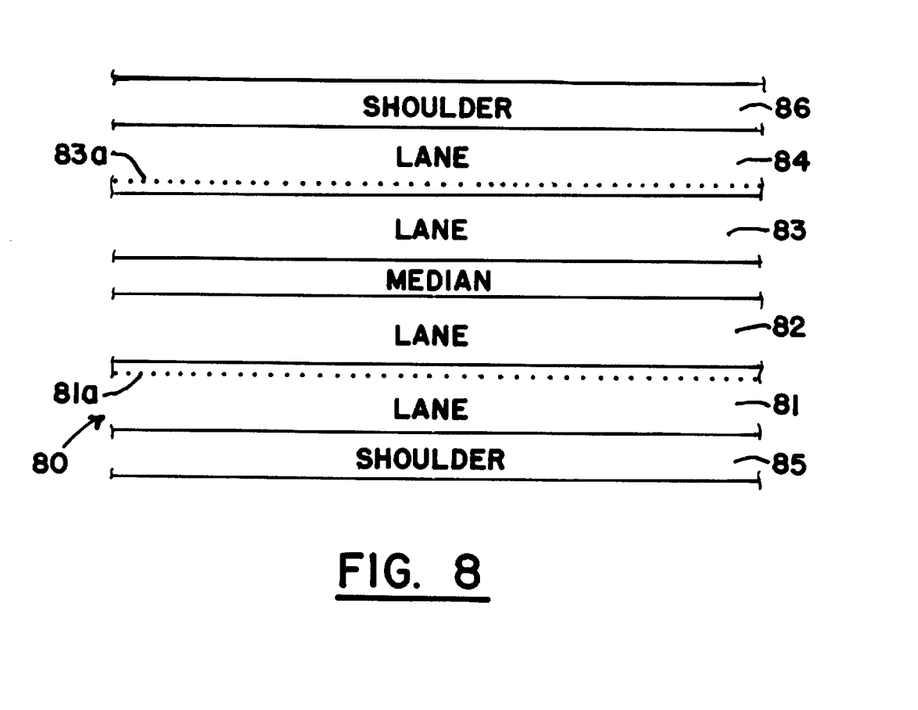
FIG. 8 is a plan view of a roadway, seen from above, showing markings in the roadway that are detectable by vehicles passing over the roadway.

Road markings and signs may also be employed to detect vehicle speed, acceleration, turns, lane changes, and other manoevers as shown in FIG. 7 and in FIG. 8. Referring to FIG. 8, each of the different lanes of a street or highway 80 may be provided with a repetitive series of different markings to distinguish that lane from the others. Lane 81 for example, may be provided with a series of equally spaced apart dot type markings 81a that are detectable by the vehicle reader 65 (FIG. 8). Pulses from reader 65 close an AND circuit 78 also energized by clock 76 to permit summation of the pulses during preset time intervals by a counter 79, indicating the speed of the vehicle. The circuit 79 may also detect the rate of changes in the received pulses to reveal acceleration and deceleration of the vehicle. Similarly other lanes of the roadway, such as lane 84, may be provided with a repetitive series of different markings 82a and summations of the pulse reading from this lane can also provide the speed and acceleration of the vehicle when proceeding along lane 84. However, in the event that the vehicle turns left from lane 81 toward lane 82, the different pattern markings in the two lanes permit the system to determine that the vehicle has turned to the left, and thereafter that the vehicle has made a lane change to the left or merely completed a left hand turn. Alternatively, the roadways may be provided with a repetition of digitally coded signs, such as 57 (FIG. 4), and these may be detected in a similar manner to detect speed, as well as to convey traffic regulations and laws as discussed above.

Recapitulating the above described preferred embodiments of the invention, the on-board system detects speeds, accelerations, turns, lane changes, and other manoevers of the vehicle by sensing accelerational forces on the vehicle and/or by detecting coded signs and/or other marking on or near the roadways. The sensed information is directed to a processor that, in turn, automatically energizes various of the vehicle indicators to alert and warn other drivers of the movements of the vehicle, as well as reminding the vehicle drivers and notifying the police that may be monitoring that roadway. The system also monitors the vehicle operation together with the externally detected information to determine whether traffic laws or regulations have been violated, and notifies others of any violations. Among others, reckless driving is determined and signaled to others, as is speeding of the vehicle, failing to stop at stop signs, and others.

Signaling

The existing indicators and signaling devices presently found on automobiles can be used according to the present invention and operated by the on-board processors in different modes than presently used to signal the various different movements as discussed above. For example, upon the system determining reckless driving of the vehicle, all existing vehicle lights may be operated in a pulsing mode, supplemented by pulsed operation of the vehicle horn. Left turns and right turns can be automatically signaled by the vehicle lights in the same manner as at present. Lane changes also by sequential operation of the turn signal lights to reveal first a turning in one direction then in another as a lane change is being completed. For forward acceleration the right and left hand vehicle indicators can be alternately pulsed; whereas for deceleration, both rear lights can be pulsed together in a flashing mode. Additional lighting and sound signalers may be provided to better call attentions to such changing movements of the vehicle, particularly when traffic violations have occurred. Unusual sounding devices, such as sirens or even voice announcing can be used, alone or together with colored lights, and others. In locations where traffic is being monitored by aircraft or helicopters, rooftop signal lights may be added to auto vehicles that would indicate violations together with showing the license plate number of the vehicle.

Incompetant Drivers

In addition to the need for warning other drivers and notifying the police to protect against reckless drivers, overly aggressive drivers, and others who knowingly drive unsafely and/or unlawfully, it is also necessary to warn others against drivers whom are fully or partially impaired and therefore constitute a danger to themselves as well as to others. Among such drivers are found those that are fully or partially impaired because of the use of alcohol or drugs, as well as those that are ill, or fall asleep, or whose eyesight is impaired, or for other reason are fully or partially unable to exercise the hand-eye coordination necessary to safely operate their vehicles. Many of such drivers are not able to maintain their vehicles in a straight path along a single lane and drift from lane to lane, even drifting onto the shoulders of the road and even crossing the road median into the path of oncoming vehicles. Others turn erratically without warning to those on their side or behind them. Other brake their vehicles unexpectedly, and start and proceed into a new lane without warning to others. Falling asleep when driving is often a result when drivers are impaired for various reasons.

According to the present invention, such dangerous movements of a vehicle are sensed or detected to operate warning indicators to others to avoid such vehicles, as well as to notify the police. This is performed in the same manner as discussed above. As an impaired driver accelerates or decelerates, these movements are detected by the sensors, and warnings are given to other vehicles. Similarly, where the driver is unable to proceed in a straight path within a roadside lane, but his vehicle drifts or wanders within that lane and to other lanes, such turning movements are detected and warning signals are given to other drivers. Whenever the brakes of the vehicle are applied by the driver it is detected, as it is presently, and continual driving at lower than the speed limit may be detected to warn and alert other vehicles. Thus whether a vehicle is being driven knowingly in an improper manner, or unknowingly by an impaired driver, the system detects the movements of the vehicle and warns other vehicle, and the police, about such movements to lessen the dangers to others.

U Turns and Turn Arounds

U turns and turn arounds are also distinguishable from other movements according to the invention When executing a U turn to the left, for example, the left accelerometer (FIG. 2) generates two successive signals (68—FIG. 6). Similarly, a right hand U turn generates two successive signals from accelerometer 41. These signals are directed to processor 44 (FIG. 2) to energize the appropriate ones of indicators 45 to 48, inclusive, thereby to alert other vehicles of these movements.

For a complete turn around of the vehicle to the left, two successive signals are initially generated by accelerometer 40, followed by two successive signals generated by accelerometer 41. Similarly, for turn arounds to the right, the accelerometer 41 initially generates two successive signals followed by two successive signals generated by accelerometer 40. Where the vehicle is turned, U turned, or turned around while backing up and traveling in reverse, the accelerometers likewise detect such movements and operate the indicators to warn other drivers. The conventional backup lights on the vehicle are also operated to alert the other drivers that these movements are being made when the vehicle is proceeding in reverse or backup.

Interior Warnings and Reminders

Drivers with various impairments as well as those whose attention is temporarily diverted from observing the roadway ahead, or whose concentration lapses for other reason, are reminded of various vehicle movements by interior display 35 (FIG. 1) and/or audible warnings or audible announcements. The on board indicator 35 may comprise a dashboard mounted display panel to display the detected movements, such as turns, braking, accelerations, and others. The display 35 additionally displays the local traffic regulations that are read by the vehicle reader 13 from digitally coded signs near or located in the roadways as shown in FIG. 4.

For displaying the traffic regulations at each section of the roadway as the vehicle proceeds, the detected coded signs 57 in the roadway, or near the roadway, may alternatively be used to reference different addresses in a digital memory contained in the processor 23 (FIG. 1). Each such address can contain the applicable traffic information for the corresponding section of the roadway identified by the coded sign. In addition, such processor memory 23 may also contain other information of use to the vehicle driver referenced to each detected location, and such other information can also be downloaded to the visual display screen 35 by the driver. Thus the on board display panel 35 can inform or remind the vehicle driver of the various movements of the vehicle, and whether or not such movements are lawful. The display 35 can additionally notify the driver of the traffic laws and regulations for each different street or roadway traveled by the vehicle. Still further the display panel 35 can still further inform the vehicle driver of additional information related to each different location being traveled by the vehicle, such as the availability of parking, gas stations, and others, all of which can be prestored in the on board processor 23 at memory addresses related to the different locations of the vehicle.

For displaying the traffic regulations at each section of the roadway as the vehicle proceeds, the detected coded signs 57 in the roadway, or near the roadway, may alternatively be used to reference different addresses in a digital memory contained in the processor 23 (FIG. 1). Each such address can contain the applicable traffic information for the corresponding section of the roadway identified by the coded sign. In addition, such processor memory 23 may also contain other information of use to the vehicle driver referenced to each detected location, and such other information can also be downloaded to the visual display screen 35 by the driver. Thus the on board display panel 35 can inform or remind the vehicle driver of the various movements of the vehicle, and whether or not such movements are lawful. The display 35 can additionally notify the driver of the traffic laws and regulations for each different street or roadway traveled by the vehicle. Still further the display panel 35 can still further inform the vehicle driver of additional information related to each different location being traveled by the vehicle, such as the availability of parking, gas stations, and others, all of which can be prestored in the on board processor 23 at memory addresses related to the different locations of the vehicle.

Other Changes

A number of additional movements of vehicles can be detected according to the invention, and warning given to other drivers when such movements may present a hazard to others. For example, skidding of the vehicle, either sideways or front and back, tilting of the vehicle, fishtailing, racing and wheel spinning, overturning, and others, can be detected and signaled. Vehicles that are driven too fast around curves in the road often skid to the left or right as the wheels fail to hold the road. Vehicles traveling over wet or icy pavement, or roads that are poorly paved can result in skidding movements. Aggressive drivers often race away from stop signs or stop lights resulting in spinning wheels as the tires fail to effectively grip the roads. These and other movements can be detected according to the invention using the accelerometers of FIGS. 1 and 2 coupled with detection of the wheel rotational movements using the conventional vehicle speedometers and/or conventional directional compasses. For example sidewise skidding can be detected using the accelerometers for detecting the direction of the skidding compared to the forward or rearward compass heading of the vehicle. Tilting of the vehicle resulting from passage over deep depressions in the roadway, or potholes, or ditches alongside the road, failure of tires, or other part of the vehicle, can be detected using gyros, pendulums, and/or other level sensing devices that are presently available. Such detected movements can be signaled to their drivers so that they can avoid those vehicles experiencing these movements that often result in loss of control of the affected vehicle. The dangerous ones of such movements, such as racing around curves, fishtailing at high speeds and others can be applied to the processor of FIG. 1 to warn of reckless driving of the vehicle.

Still other movements or conditions of the vehicle or its driver can be monitored to determine if there is danger to others. For example, where the steering wheel of the vehicle is too frequently turned, or oscillated, or where the foot pedals of the brake and gas pedals are too frequently applied from one to the other indicative of an impaired or incompetent driver. Since these and others can be made without departing from the scope of this invention, this invention should be considered as being limited only by the following claims.

What is claimed is:

1. A reckless driving system for automotive vehicles for alerting other drivers about the improper handling and driving of a vehicle wherein said system monitors a continuing series of vehicle movements occurring within preset intervals to determine if an unacceptable pattern of such movements has occurred contrary to the driving habits being followed by more responsible and reasonable drivers of such vehicles, comprising:

movement monitoring means for said vehicle for detecting each acceleration, deceleration, lane change, right and left turn, and vehicle braking, and generating a response signal for each such movement, a timer operating for a preset period after each actuation thereof, an accumulator energized by the timer and said response signals for summing the number of response signals being generated during the preset period of the timer, said accumulator generating a reckless driving signal after receiving a predetermined number of said response signals, and warning means associated with the vehicle being energized by the reckless driver signal to warn other vehicles that the vehicle has been driven recklessly.

2. In the system of claim 1, said monitoring means additionally detecting violations of traffic laws and regulations, and generating a response signal in response to each violation.

3. In a reckless driving detection system for repetitively monitoring the movements of an automotive vehicle during successive preset time intervals and signaling when the vehicle is being driven in a reckless manner, and wherein said movements include accelerations, lane changes, and braking, and wherein said movements are monitored during each of said preset time intervals, comprising:

sensor means for omnidirectionally detecting said movements discontinuous timing means initiated by detected vehicle movements for operating during a preset time interval, analyzer means responsive to said sensor means during the operation of said timer means for counting the number of detected vehicle movements during said preset time interval and generating a reckless driving signal when a predetermined number of such movements have been detected, said timing means being repetitively initiated in sequence after each preset time interval has expired responsively to subsequently detected movements of the vehicle, thereby to provide a continual monitoring of the vehicle.

4. A reckless driving detection system for automotive vehicles that continually monitors changes in movement of the vehicle during preset time intervals, which changes may be both permitted by traffic laws and those not permitted by such laws, said system responding during each preset interval to the occurance of a predetermined number of such movement changes to determine whether the vehicle is being driven recklessly, said system comprising:
plural sensor means for detecting movement changes of the vehicle in different directions, timing means activated by the senor means to operate during a present interval following each activation, accumulator means energized by said sensor means to count the number of movement changes made by the vehicle during each preset interval, and signaling means responsive to said accumulator means summing a predetermined number of such movement changes occurring during a preset interval to warn others of the aggressive driving of the vehicle.

5. An automatic signaling system for automotive vehicles for warning others of various movements of the vehicle that may be unexpected or erratic, comprising:

sensing means for detecting movements of the vehicle in various directions including turns, U turns, lane changes, accelerations, pivoting, skidding, fishtailing, skidding, tilting, swaying, and rolling, analyzing means responsive ro said sensing means, said vehicle having plural indicators, and said analyzing means energizing said indicators to automatically signal to others said movements of the vehicle.

6. In the vehicle automatic signaling system of claim 5, accumulator means for counting the number of accelerations, stop-starting, turning, lane changes, and braking occurring within preset time intervals, and energizing a reckless driving signal when a predetermined of such events have been counted during a preset interval.

7. An automotive system for detecting unsafe operation of a vehicle by an impaired driver resulting from one or more of alcohol or substance abuse; driver disability from aging or illness; or other physical-mental disability comprising:

sensor means for detecting driving events including one or more of consistently low driving speed below the speed limits, excessive number of applied braking of the vehicle, and continual changes in side to side movements of the vehicle within and between lanes in the roadway, and generating a response signal for each of said detected events, a counting means for counting the number of said response signals being generated within a preset time interval and generating an unsafe driving signal whenever a predetermined number of said response signals have been counted, and warning means energized by said unsafe driving signal.

8. An automotive system for detecting unsafe operation of a vehicle by an impaired driver resulting from one or more of alcohol or substance abuse, driver disability from aging or illness, or other physical-mental disability comprising:

on-board sensors for detecting one of consistently low driving speed below the the speed limits, excessive number of braking of the vehicle, and continual side movements within and between lanes in the roadway, and generating response signals, an analyzer for responding to said signals, and warning devices for said vehicle being energized by said analyzer to communicate said detected condition to others located externally of the vehicle, said sensor detecting side movements of the vehicle within and between lanes comprising an on-board wireless detector for reading markings in the roadway traveled by the vehicle.

9. An automotive system for detecting unsafe operation of a vehicle by an impaired driver resulting from one or more of alcohol or substance abuse, driver disability from aging or illness, or other physical-mental disability comprising:

on-board sensors for detecting one of consistently low driving speed below the speed limits, excessive numbers of braking of the vehicle, and continual side movements within and between lanes in the roadway, and generating response signals, said analyzer including a counter for counting the number of such signals occurring during preset time intervals and generating a warning signal when the counter number reaches a predetermined number, and warning devices for said vehicle being energized by said warning signal to communicate said unsafe driving to others located externally of the vehicle, said sensor detecting movements of the vehicle within and outside of a roadway lane comprising a sensor for the vehicle for detecting cyclically changing side movements of the vehicle.

10. An automotive system for detecting unsafe operation of a vehicle by an impaired driver resulting from one or more of alcohol or substance abuse, driver disability from aging or illness, or other physical-mental disability comprising:

on-board sensors for detecting one of consistently low driving speed below the the speed limits, excessive number of braking of the vehicle, and continual side movements within and between lanes in the roadway, and generating response signals, an analyzer for responding to said signals, said analyzer including a counter for counting the number of said response signals, and warning devices for said vehicle being energized by said analyzer to communicate to others externally of the vehicle, said sensor detecting movements of the vehicle by an impaired driver comprising a sensor for detecting cyclically changing sidewise movements of the vehicle and combined with detecting repeated braking of the vehicle.

11. An automotive system for detecting unsafe operation of a vehicle resulting from one or more of alcohol or substance abuse, driver disability from aging or illness, or other physical-mental disability comprising:

on-board sensors for detecting one of consistently low driving speed below the speed limits, excessive number of braking of the vehicle, and continual side movements within and between lanes in the roadway, and generating response signals, an analyzer responding to said signals and including a counter for counting the number of response signals, and warning devices for said vehicle energized by said analyzer to communicate to others located externally of the vehicle, said warning devices communicating operation of the vehicle by an impaired driver by counting a predetermined number of response signals including repeated braking of the vehicle combined with repeated changes in vehicle speed.

12. A reckless driving detection system for automotive vehicles that continually monitors changes in movement of the vehicle during preset time intervals, which changes may be both permitted by traffic laws and not permitted by such laws, said system responding during each preset interval to the occurance of a predetermined number of such movement changes to determine whether the vehicle is being driven recklessly, said system comprising:

plural sensor means for detecting movement changes of the vehicle in different directions, timing means activated by the sensor means to operate during a preset interval following each activation, accumulator means energized by said sensor means to count the number of movement changes made by the vehicle during each preset interval, and signaling means responsive to said accumulator means summing a predetermined number of such movement changes occurring during a preset interval to warn others of the reckless driving of the vehicle, said sensor means detecting plural ones of accelerations, braking, turning, wheel spinning, skidding, fishtailing, tilting, rolling, pitching, and swaying.

13. A reckless driving detection system for automotive vehicles that continually monitors changes in movement of the vehicle during preset time intervals, which changes may be both permitted by traffic laws and those not permitted by such laws, said system responding during each preset interval to the occurance of a predetermined number of such movement changes to determine whether the vehicle is being driven recklessly, said system comprising:

plural sensor means for detecting movement changes of the vehicle in different directions, timing means activated by the sensor means to operate during a preset interval following each activation, accumulator means energized by said sensor means to count the number of movement changes made by the vehicle during each preset interval, and signaling means responsive to said accumulator means summing a predetermined number of such movement changes occurring during a preset interval to warn others of the reckless driving of the vehicle, said system being reactivated during recurring preset intervals in response to sensed movement changes occurring after each preset interval has terminated, thereby to continually monitor the movements of the vehicle.

14. A reckless driving system for automotive vehicles for alerting other drivers of the improper handling and driving of a vehicle, wherein said system monitors a continuing series of vehicle movements occurring within preset intervals to determine if an unacceptable pattern of such movements has occurred contrary to the driving habits being followed by more responsible and reasonable drivers of such vehicles, comprising:

movement monitoring means for said vehicle for detecting each acceleration, deceleration, lane change, right and left turn, and vehicle braking, and generating a response signal for each such movement, a timer operating for a preset interval after each actuation thereof, an accumulator energized by the timer and said response signals for summing the number of response signals being generated during the preset period of the timer, said accumulator generating a reckless driving signal after receiving a predetermined number of said response signals, and warning means associated with the vehicle being energized by the reckless driving signal to warn other vehicles that the vehicle has been driven recklessly, said monitoring means additionally detecting proximity of the vehicle to objects including other vehicles, and generating a response signal upon detecting proximity less than a preset distance.

15. A reckless driving system for automotive vehicles for alerting other drivers of the improper handling and driving of a vehicle wherein said system monitors a continuing series of vehicle movements occurring within preset intervals to determine if an unacceptable pattern of such movements contrary to the driving habits being followed by more responsible and reasonable drivers of such vehicles, comprising:

movement monitoring means for said vehicle for detecting each acceleration, deceleration, lane change, right and left turn, and vehicle braking, and generates a response signal for each said movement, a timer operating for a preset period after each actuation thereof, an accumulator energized by the timer and said response signals for summing the number of response signals being generated during the preset period of the timer, said accumulator generating a reckless driving signal after receiving a predetermined number of said response signals, and warning means associated with the vehicle being energized by the reckless driver signal to warn other vehicles that the vehicle has been driven recklessly, said monitor means including a wireless reader for the vehicle for reading the content of coded signs proximate the roadway traveled by the vehicle.

16. A reckless driving system for automotive vehicles for alerting other drivers of the improper handling and driving of a vehicle wherein said system monitors a continuing series of vehicle movements occurring within preset intervals to determine if an unacceptable number of such movements has occurred contrary to the driving habits being followed by more responsible and reasonable drivers of such vehicles, comprising:

movement monitoring means for said vehicle for detecting each acceleration, deceleration, lane change, right and left turn, and vehicle braking, and generating a response signal for each such movement, a timer operating for a preset period after each operation thereof, an accumulator energized by the timer and said response signals for summing the number of response signals being generated during the preset period of the timer, said accumulator generating a reckless driving signal after receiving a predetermined number of said response signals, and warning means associated with the vehicle being energized by the reckless driving signal to warn other vehicles that the vehicle has been driven recklessly, said monitoring means detecting vehicle turns and lane changes and energizing the turn indicators of the vehicle in response to each said movement.

17. A reckless driving system for automotive vehicles for alerting other drivers about the improper handling and driving of a vehicle wherein said monitoring a continuing series of vehicle movements occurring within preset intervals to determine if an unacceptable number of such movements has occurred contrary to the driving habits being followed by more responsible and reasonable drivers of such vehicles comprising:

movement monitoring means for said vehicle for detecting each acceleration, deceleration, lane change, right and left turn, and vehicle braking, and generating a response signal for each said movement, a timer operating for a preset period after each actuation thereof, an accumulator energized by the timer and response signals for determining the number of response signals being generated during the preset period of the timer, said accumulator generating a reckless driving signal after receiving a predetermined number of said response signals, and warning means associated with the vehicle being energized by the reckless driving signal to warn other vehicles that the vehicle has been driven recklessly, said monitoring means including a wireless reader for the vehicle for reading the content of coded traffic signs identifying the speed limit for the roadway and the presence of stop signs and indicators.

18. A system for determining when an automotive vehicle is being driven in an overly aggressive and reckless manner by determining when an excessive number of changes in vehicle movements have occurred within a preset time interval, onboard sensors for the vehicle for detecting changes in vehicle movements that can include accelerations and turns, and a time operated counter means energized by the sensors for counting the number of such movement changes occurring within a preset time interval and generating an aggressive driving signal when the number reaches a predetermined number, said time operated counter being successively operated to count vehicle movements during successive time intervals.

* * * * *